United States Patent [19]

Bambara et al.

[11] Patent Number: 6,004,647
[45] Date of Patent: Dec. 21, 1999

[54] POLYMER BLEND

[75] Inventors: John D. Bambara; Matthew L. Kozma, both of Osterville, Mass.; Todd Cagwin, St. Johnsville, N.Y.; Robert F. Hurley, Centerville, Mass.

[73] Assignee: Sentinel Products Corp., Hyannis, Mass.

[21] Appl. No.: 08/888,431

[22] Filed: Jul. 7, 1997

Related U.S. Application Data

[62] Division of application No. 08/669,987, Jun. 21, 1996.

[51] Int. Cl.⁶ .............................. C08L 15/00; C08L 23/16; C08L 23/26
[52] U.S. Cl. ..................... 428/66.4; 525/196; 525/197; 525/198; 525/222; 521/143; 264/299; 264/319
[58] Field of Search ................................. 525/196, 197, 525/198, 222; 521/143, 134; 428/66.4

[56] References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Rubens et al. . |
| 3,098,831 | 7/1963 | Carr . |
| 3,098,832 | 7/1963 | Pooley et al. . |
| 3,238,565 | 3/1966 | Jacobs . |
| 3,287,477 | 11/1966 | Vesilind . |
| 3,335,892 | 8/1967 | Hildreth . |
| 3,338,864 | 8/1967 | Megall et al. . |
| 3,346,686 | 10/1967 | Collins . |
| 3,379,802 | 4/1968 | Raley . |
| 3,396,062 | 8/1968 | White . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,431,164 | 3/1969 | Gilbert . |
| 3,539,473 | 11/1970 | Simpson et al. . |
| 3,565,243 | 2/1971 | Freeman . |
| 3,639,304 | 2/1972 | Raley, Jr. . |
| 3,644,230 | 2/1972 | Cronin . |
| 3,645,155 | 2/1972 | Robinson . |
| 3,645,992 | 2/1972 | Elston . |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muroi et al. . |
| 3,755,208 | 8/1973 | Ehrenfreund . |
| 3,804,684 | 4/1974 | Tokushige et al. . |
| 3,808,300 | 4/1974 | Miyamoto et al. . |
| 3,814,779 | 6/1974 | Wiley . |
| 3,886,100 | 5/1975 | Yasuda et al. . |
| 3,936,518 | 2/1976 | Soda et al. . |
| 3,938,661 | 2/1976 | Carmody . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojiri et al. . |
| 3,966,381 | 6/1976 | Suh . |
| 3,976,530 | 8/1976 | Callan . |
| 3,996,171 | 12/1976 | Holland et al. . |
| 4,048,275 | 9/1977 | Usamoto et al. . |
| 4,053,341 | 10/1977 | Kleiner et al. . |
| 4,058,583 | 11/1977 | Glander et al. . |
| 4,062,712 | 12/1977 | Stark . |
| 4,076,698 | 2/1978 | Anderson et al. . |
| 4,080,344 | 3/1978 | Ikeda et al. . |
| 4,089,818 | 5/1978 | Slocumb . |
| 4,102,720 | 7/1978 | Kaneko et al. . |
| 4,102,829 | 7/1978 | Watanabe et al. . |

(List continued on next page.)

FOREIGN PATENT DOCUMENTS

| | | |
|---|---|---|
| 451864 | 10/1948 | Canada . |
| 0 584 927 A2 | 3/1994 | European Pat. Off. . |
| 0 702 032 A2 | 3/1996 | European Pat. Off. . |
| WO 90/03414 | 4/1990 | WIPO . |
| WO 92/14784 | 9/1992 | WIPO . |
| WO 93/03093 | 2/1993 | WIPO . |

OTHER PUBLICATIONS

Modern Plastics, Raw Materials, "Polyethylene, Markets Expanding very rapidly and technology at unequalled rate," John Mac Adams, pp. B–3–B–5, Nov. 1995.

Exxon Chemical/Markets & Products: Product Listings Plastics—polyethylene, polypropylene; Products From Exxpol metallscene catalysis pp. Jan. 1–3, 1999.

Borg, "Ethylene/Propylene Rubber" *Rubber Technology*, Van Nostrand Reinhold Company, pp. 220–248, 1973, the month in the date of publication is not available.

Mukherjee et al., "Radiation–Induced Changes in Polyolefins" Rev. Macromol. Chem. Phys., C26(3):415–436 1986, The month in the date of publication is not available.

Park, "Handbook of Polymeric Foams and Foam Technology, Polyolefin Foam," Oxford University Press, Chapter 9, pp. 156–242. Date?The date of publication is not available.

Underwriters Laboratories, Inc., Subjects 1123, 1191, Nov. 30, 1992.

Underwriters Laboratories, Inc., Subject 1191, Feb. 27, 1992.

Ultsch & Fritz, "Crosslinking of LLDPE and VLDPE via graft–polymerized vinyltrimethoxysilane" *Rubber Processing and Applications*, 13:81–91, 1990, the month in the date of publication is not available.

*Primary Examiner*—P. Hampton-Hightower
*Attorney, Agent, or Firm*—Fish & Richardson P.C.

[57] ABSTRACT

The invention relates to polymer blends which can be used both in foamed and unfoamed states as a replacement for conventional EPDM and other elastomers. The composition of the blend includes a single-site catalyzed polyolefin resin having a density of below 0.878 g cm$^{-3}$ and up to 40 weight percent a polyolefin including ethylene and propylene. The polymer blend is cross-linked. The polymer blends are formable and foamable. The use of sulfur to vulcanize the polymer blend is not necessary. The polymer blends can be used to make foam for floatation or for making gaskets.

14 Claims, No Drawings

U.S. PATENT DOCUMENTS

| | | |
|---|---|---|
| 4,110,269 | 8/1978 | Ehrenfruend . |
| 4,117,195 | 9/1978 | Swarbrick et al. . |
| 4,126,598 | 11/1978 | Reighter . |
| 4,142,956 | 3/1979 | Shikinami et al. . |
| 4,146,598 | 3/1979 | Coyne . |
| 4,163,085 | 7/1979 | Kuhnel et al. . |
| 4,168,353 | 9/1979 | Kitamori . |
| 4,181,647 | 1/1980 | Beach . |
| 4,181,762 | 1/1980 | Benedyk . |
| 4,182,398 | 1/1980 | Salyer et al. . |
| 4,203,815 | 5/1980 | Noda et al. . |
| 4,209,473 | 6/1980 | Coyne . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fujimoto et al. . |
| 4,234,531 | 11/1980 | Jocteur . |
| 4,241,832 | 12/1980 | Bliss . |
| 4,247,651 | 1/1981 | Ohno et al. . |
| 4,275,023 | 6/1981 | Shimizu et al. . |
| 4,292,106 | 9/1981 | Herschdorfer et al. . |
| 4,303,756 | 12/1981 | Kajimura et al. . |
| 4,303,757 | 12/1981 | Kajimura et al. . |
| 4,308,352 | 12/1981 | Knaus . |
| 4,333,898 | 6/1982 | Schmidtchen . |
| 4,337,321 | 6/1982 | Allada . |
| 4,347,329 | 8/1982 | Park . |
| 4,370,378 | 1/1983 | Zabrocki et al. . |
| 4,379,859 | 4/1983 | Hirosawa et al. . |
| 4,389,514 | 6/1983 | Schmidle et al. . |
| 4,395,459 | 7/1983 | Herschdorfer et al. . |
| 4,399,087 | 8/1983 | Akiyama et al. . |
| 4,429,059 | 1/1984 | Ozutsumi et al. . |
| 4,433,029 | 2/1984 | Senda et al. . |
| 4,440,703 | 4/1984 | Akiyama et al. . |
| 4,443,393 | 4/1984 | Akiyama et al. . |
| 4,444,948 | 4/1984 | Hochstrasser . |
| 4,446,254 | 5/1984 | Nakae et al. . |
| 4,448,901 | 5/1984 | Senda et al. . |
| 4,464,425 | 8/1984 | Voigt et al. . |
| 4,473,665 | 9/1984 | Martini-Vvedensky et al. . |
| 4,504,534 | 3/1985 | Adachi et al. . |
| 4,510,031 | 4/1985 | Matsumura et al. . |
| 4,515,907 | 5/1985 | McCullough et al. . |
| 4,526,930 | 7/1985 | Keogh . |
| 4,542,164 | 9/1985 | Nishioka et al. . |
| 4,554,283 | 11/1985 | Park . |
| 4,554,293 | 11/1985 | Park . |
| 4,581,383 | 4/1986 | Park . |
| 4,591,606 | 5/1986 | Bergstrom . |
| 4,592,468 | 6/1986 | Wallace . |
| 4,605,682 | 8/1986 | Park . |
| 4,633,361 | 12/1986 | Ela et al. . |
| 4,640,933 | 2/1987 | Park . |
| 4,652,588 | 3/1987 | Park . |
| 4,663,361 | 5/1987 | Park . |
| 4,666,946 | 5/1987 | Fudge . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. . |
| 4,709,817 | 12/1987 | Keady et al. . |
| 4,714,716 | 12/1987 | Park . |
| 4,725,492 | 2/1988 | Yazaki et al. . |
| 4,739,547 | 4/1988 | Tanaka et al. . |
| 4,759,992 | 7/1988 | Tomko et al. . |
| 4,762,860 | 8/1988 | Park . |
| 4,767,814 | 8/1988 | Bae et al. . |
| 4,791,143 | 12/1988 | Tanaka et al. . |
| 4,791,147 | 12/1988 | Tanaka et al. . |
| 4,818,789 | 4/1989 | Tomko et al. . |
| 4,824,059 | 4/1989 | Butler . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,937,284 | 6/1990 | Bergstrom . |
| 4,937,299 | 6/1990 | Ewen et al. . |
| 4,958,770 | 9/1990 | Mitchell . |
| 4,960,830 | 10/1990 | Hazelton et al. . |
| 5,026,736 | 6/1991 | Pontiff . |
| 5,047,476 | 9/1991 | Keogh . |
| 5,053,446 | 10/1991 | Salyer . |
| 5,064,802 | 11/1991 | Stevens et al. . |
| 5,064,903 | 11/1991 | Peiffer . |
| 5,086,121 | 2/1992 | Hazelton et al. . |
| 5,093,206 | 3/1992 | Schoenbeck . |
| 5,112,919 | 5/1992 | Furrer et al. . |
| 5,132,380 | 7/1992 | Stevens et al. . |
| 5,151,204 | 9/1992 | Struglinski . |
| 5,186,851 | 2/1993 | Gutierrez et al. ................. 508/190 |
| 5,206,075 | 4/1993 | Hodgson, Jr. ................... 508/189 |
| 5,210,150 | 5/1993 | Prejean . |
| 5,246,783 | 9/1993 | Spenadel et al. ................ 428/216 |
| 5,268,115 | 12/1993 | Gutierrez et al. ............... 428/461 |
| 5,272,236 | 12/1993 | Lai et al. ........................ 508/542 |
| 5,275,747 | 1/1994 | Gutierrez et al. ............. 526/348.5 |
| 5,277,833 | 1/1994 | Song et al. ...................... 508/241 |
| 5,278,264 | 1/1994 | Spaleck et al. .................. 508/241 |
| 5,278,272 | 1/1994 | Lai et al. ........................ 526/127 |
| 5,288,762 | 2/1994 | Park et al. ........................ 521/79 |
| 5,304,580 | 4/1994 | Shibayama et al. .............. 521/150 |
| 5,318,649 | 6/1994 | Nishino et al. ............. 156/244.27 |
| 5,322,728 | 6/1994 | Davey et al. ..................... 442/401 |
| 5,329,033 | 7/1994 | Spaleck et al. ..................... 556/53 |
| 5,340,840 | 8/1994 | Park et al. ........................ 521/60 |
| 5,345,002 | 9/1994 | Song et al. ...................... 568/793 |
| 5,350,817 | 9/1994 | Winter et al. .................... 526/119 |
| 5,366,647 | 11/1994 | Gutierrez et al. ............... 508/468 |
| 5,369,136 | 11/1994 | Park et al. ...................... 521/143 |
| 5,376,428 | 12/1994 | Palazzoto et al. ............... 428/143 |
| 5,380,810 | 1/1995 | Lai et al. ........................ 526/352 |
| 5,382,698 | 1/1995 | Song et al. .......................... 568/3 |
| 5,385,972 | 1/1995 | Yamamoto et al. .............. 524/579 |
| 5,387,620 | 2/1995 | Park et al. ...................... 521/143 |
| 5,391,629 | 2/1995 | Turner et al. ................... 525/268 |
| 5,407,965 | 4/1995 | Park et al. ........................ 521/81 |
| 5,408,004 | 4/1995 | Lai et al. ........................ 525/240 |
| 5,461,110 | 10/1995 | Arthurs et al. . |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |

POLYMER BLEND

This is a divisional of copending application Ser. No. 08/669,987, filed Jun. 21, 1996.

BACKGROUND OF THE INVENTION

The invention relates to cross-linked polymer blends including single-site initiated polyolefin resins and polyolefins including ethylene and propylene.

Polymer blends that can be formed (i.e., thermoformed or pressure-formed) are useful in a number of applications, particularly, when the polymer blends have good flexibility properties, high thermal stability, and are foamable. For example, these materials can be used as components in floatation devices for water sports or as sealing or gasket components in, e.g., the automotive industry. Traditionally, the physical properties required by these types of applications suggest the use of high density foams.

In general, polymer blends with these properties are based, in part, on cross-linked ethylene-propylene-diene monomer (EPDM) terpolymers or ethylene-vinyl acetate (EVA) copolymers. These materials generally contain other additives, such as plasticizers, to add to their flexibility. Thermal stability is typically achieved by sulfur vulcanization of the compositions. However, plasticizers can leach out of the materials over time which can make the materials less flexible and the sulfur additives can make the material less desirable for environmental reasons.

SUMMARY OF THE INVENTION

The invention features polymer blends which can be used both in foamed and unfoamed states as a replacement for conventional EPDM and other elastomers. The composition of the polymer blend includes a single-site catalyzed polyolefin resin having a density of below 0.878 g cm$^{-3}$ and up to 40 weight percent of a polyolefin including ethylene and propylene. The polymer blend is cross-linked. The use of sulfur to vulcanize the polymer blend is not necessary.

In one aspect, the invention features a polymer blend including a single-site initiated polyolefin resin having a density below 0.878 g cm$^{-3}$ and up to 40 weight percent of a polyolefin that includes ethylene and propylene. A portion of the polymer blend is cross-linked. In addition, the polymer blend is formable. In preferred embodiments, the polymer blend is foamed.

In another aspect, the invention features a method of making a cross-linked polymer blend including the steps of providing a polymer mixture including a single-site initiated polyolefin resin and up to 40 weight percent of a polyolefin including ethylene and propylene, and cross-linking the polymer mixture.

In preferred embodiments, the step of cross-linking the polymer blend includes reacting the polymer blend with a peroxide. In other preferred embodiments, the method further includes the step of expanding the polymer mixture to form a foam. It is preferred that the step of expanding the polymer mixture include compression molding the polymer mixture at increased temperature and pressure. Preferably, compression molding comprises the steps of pressing the polymer mixture using a high tonnage press at a temperature of between 275 and 320° F. and a pressure of between 250 and 2500 psi for between 20 and 90 minutes followed by heating the polymer mixture at a temperature between 300 and 380° F. The step of heating the polymer mixture further preferably includes pressing the blend using a medium tonnage press at a pressure of between 250 and 1500 psi.

In yet another aspect, the invention features a gasket including a polymer blend including a single-site initiated polyolefin resin having a density below 0.878 g cm$^{-3}$ and up to 40 weight percent of a polyolefin including ethylene and propylene. A portion of the polymer blend is cross-linked. The gasket is thermally stable at 120° F.

In another aspect, the invention features a method of making a gasket including the steps of providing a polymer blend including a single-site initiated polyolefin resin having a density below 0.878 g cm$^{-3}$ and up to 40 weight percent of a polyolefin including ethylene and propylene, and forming the polymer blend in a mold in the shape of a gasket. A portion of the polymer blend is cross-linked and the gasket is thermally stable at 120° F. In preferred embodiments, the step of forming includes pressing the polymer blend in the mold. Preferably, the step of forming includes heating the polymer blend in the mold.

In preferred embodiments, the polymer blend includes at least 5 percent of the single-site initiated polyolefin resin and at least 5 percent of the polyolefin that includes ethylene and propylene. It is preferred that the polyolefin that includes ethylene and propylene is an ethylene-propylene-diene monomer (EPDM) terpolymer or an ethylene propylene rubber (EPR), most preferably EPDM.

In preferred embodiments, the polymer blend further includes less than about 70 weight percent of a second polyolefin resin. It is preferred that the second polyolefin resin include a polypropylene, a polyethylene, or a copolymer containing ethylene or propylene. The second polyolefin resin can be a blend or mixture of polymer resins. The polyethylene preferably includes a low density polyethylene, a linear low density polyethylene, a medium density polyethylene, or a high density polyethylene. The copolymer preferably includes an ethylene-vinyl acetate copolymer, an ethylene-maleic anhydride copolymer, or an ethylene-ethyl acetate copolymer.

In other preferred embodiments, the polymer blend includes between about 5 and 95 weight percent of the single-site initiated polyolefin resin and about 5 and 40 weight percent of the polyolefin including ethylene and propylene, preferably an ethylene-propylene-diene monomer terpolymer. It is preferred that the polymer blend further include up to about 65 weight percent of a filler. It is preferred that the polymer blend further include up to about 30 weight percent of an oil.

Preferably, the foamed polymer blend has an average foam density between 1.5 and 25 pounds per cubic foot.

Copolymers include polymers resulting from the polymerization of two or more monomeric species, for example, polyolefins including ethylene and propylene. Copolymers including ethylene and propylene can be ethylene-propylene rubbers (EPR). Copolymers include terpolymers resulting from the polymerization of three monomeric species (e.g., as in EPDM), sesquipolymers, and greater combinations of monomeric species.

A polyolefin including ethylene and propylene can be an ethylene-propylene-diene monomer (EPDM) terpolymer. EPDM can be a polyolefin including ethylene, propylene, and a non-conjugated diene that have been polymerized together to afford a copolymer (in this case a terpolymer). The polymerization initiator can be any known initiator, including a single-site initiator. For examples of polyolefins including ethylene and propylene (i.e., EPR or EPDM resins), see Borg, "Ethylene/Propylene Rubber," in *Rubber Technology*, M. Morton, Ed., Van Nostrand Reinhold Company, New York, 1973, pp. 220–248.

Single-site initiated polyolefin resins can be polyolefins prepared from a single-site initiator and have controlled molecular weights and molecular weight distributions. The single-site initiated polyolefin resin can be, for example, polyethylene, polypropylene, or a copolymer of ethylene and alpha-unsaturated olefin monomers.

The specific gravities of the polymer resins can be measured using ASTM D-792 methods.

The foams are generally closed-cell foams in which greater than approximately 70% of the form cell volumes have cell walls isolating them from the external atmosphere. One way to determine this is by measuring the amount of water that is absorbed into the foam when the foam is immersed in water.

The invention can have one or more of the following advantages. The polymer blends can have improved flexibility and thermal stability over blends that do not include single-site initiated polyolefin resins. Flexibility can be measured, for example, by compressing the material by 25 percent and measuring the force it takes to compress the foam. Other advantages of the materials include thermoformability, and the ability to laminate to other materials or to itself without adhesives.

The polymer blends, and foamed polymer blends, that include single-site initiated polyolefin resins and a polyolefin including ethylene and propylene have good flexibility without the addition of other components such as plasticizers, for example. Plasticizers can leach out of the polymer blends and foamed polymer blends over time, leading to degradation of the physical properties of the polymer blends. The polymer blends based on single-site initiated polyolefin resins do not require plasticizer components to enhance their physical properties. Since the polymer blends are cross-linked, they do not contain sulfur or chlorine-containing materials.

The foamed polymer blends generally have other advantages over conventional EPDM and EVA foams as well as foams produced with single-site initiated polyolefin resins without a polyolefin including ethylene and propylene. The densities of the foamed polymer blends can be lower than foams that do not contain a polyolefin including ethylene and propylene and a single-site initiated polyolefin resin. At equivalent densities, the foamed polymer blends tend to have better tensile and tear strength than foams that do not contain a polyolefin including ethylene and propylene and a single-site initiated polyolefin. The polymer blends and foamed polymer blends also can be formed (e.g., thermoformed or pressure-formed) into a shaped article. In other preferred embodiments, the polymer blends and foamed polymer blends can be thermoset or die-cut.

The foamed polymer blends tend to be flexible and have superior weather resistance. Increased cross-linking gives the foam good compression set resistance, creep and stress relaxation resistance, and good thermal stability. The amount of cross-linking in the polymer blends can range from about 24 to 100 percent. When the polymer blend can be thermoformed, the amount of cross-linking preferably can range from about 40 to 60 percent. When the polymer blend can be thermoset, the amount of cross-linking can range from about 95 to 100 percent.

The useable temperature range of the polymer blends is extended. The polymer blends can be exposed to temperatures up to 160° F. on a continuous basis and up to about 410° F. for brief periods of time under some circumstances. This quality makes the polymer blends useful in foam applications for floatation, automotive applications (e.g., gaskets, and door and window seals), and athletics, where flexibility at low temperatures can be important. When compared to EVA foams of equivalent compression deflection, the foam generally has superior physical properties and thermal stability. Increased thermal stability is an important factor in automotive applications such as gasketing.

The thermal stability of the polymer blends can be related to the dimensional stability of the polymer blends at elevated temperatures. The dimensional changes are preferably less than 8 percent and more preferably less than 5 percent.

The tensile strength, elongation, compression resistance (compression deflection), compression set, and tear resistance of the foamed polymer blends can be measured according to ASTM D-3575.

Other features and advantages of the invention will be apparent from the following detailed description thereof, and from the claims.

DETAILED DESCRIPTION

The polymer blends include at least one single-site initiated polyolefin resin and a polyolefin including ethylene and propylene. The polyolefin including ethylene and propylene can be an EPR or EPDM resin. Some EPR or EPDM resins are available commercially from Exxon Chemical Company, Houston, Tex., under the tradename Vistalon™, and include Vistalon™ 5800, Vistalon™ 6205, Vistalon™ 7000, Vistalon™ 7500, Vistalon™ 8000, Vistalon™ 2200, Vistalon™ 2504, Vistalon™ 2555, Vistalon™ 2727, Vistalon™ 4608, Vistalon™ 719, Vistalon™ 3708, Vistalon™ 404, Vistalon™ 457, Vistalon™ 503, Vistalon™ 707, and Vistalon™ 878. Other EPDM resins are available commercially from DuPont, Wilmington, Del., under the tradename Nordel™ and include Nordel™ 2522, Nordel™ 2722, Nordel™ 1440, Nordel™ 1470, Nordel™ 1145, Nordel™ 1040, and Nordel™ 1070. Preferred resins are EPDM resins, including Nordel™ 1440 and Vistalon™ 2504.

Single-site initiated polyolefin resins can be prepared using single-site initiators to polymerize a variety of olefins. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators.

The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

The polyolefins provided by single-site initiators are essentially linear, meaning that the polymers can contain uniformly distributed, highly controlled short chain branching sites. As used herein, the term "essentially linear" means that the polymers have less than about one long-chain branch for every ten thousand carbon atoms in the backbone of the polymer. As described above, one method of determining branching is $^{13}$C NMR spectroscopy. The term "short-chain branching," as used herein, means a branch of a polymer backbone of 6 carbon atoms or less which can be distinguished by $^{13}$C NMR spectroscopic methods.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a comonomer content within 50% of the median bulk molar comonomer content. Copolymers are generally polymers of ethylene with $C_3$–$C_{20}$ alpha-olefins, and/or diolefins, or with other unsaturated monomers such as acrylates and styrenes.

The "melt index" (MI) of a polymer resin is a measurement of processability under low shear rate conditions. The MI can be determined by ASTM D-1238 Condition E (190° C./2.16 kg). The MI of the single-site initiated polyolefin resins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238.

The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane.

The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

Preferred single-site initiated polyolefin resins are described, for example, in S. -Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage™ and Affinity™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the single-site initiated polyolefin resins are selected from the group consisting of EG8100, EG8180, and EG8200.

Additionally, the polymer blend can contain up to 70 weight percent of other polymer resins other than the single-site initiated polyolefin resin and the polyolefin including ethylene and propylene. The other polymer resins can be mixed or blended. Other polymer resins include, for example, other single-site initiated polyolefins, low density polyethylene (LDPE), high density polyethylene (HDPE), linear low density polyethylene (LLDPE), ethylene-propylene rubber, polystyrene, polyvinylchloride (PVC), polyamides, polyacrylates, celluloses, polyesters, polyhalocarbons, and copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, polyacrylates, butyl rubber, or halobutyl rubber. The rubber material can be peroxide-cured. Preferred polymer resins included in the polymer blend include other single-site initiated polyolefins, LDPE, LLDPE, polypropylene, polystyrene, or ethylene copolymers such as ethylene-vinyl acetate copolymer (EVA), or ethylene-ethyl acrylate copolymer (EEA).

The polymer blends of the invention are cross-linked. Cross-linking is generally introduced by reaction of the polymers with a cross-linking agent. Cross-linking can take place partially during blending of the polymer components. Alternatively, the cross-linking can take place predominantly during expansion of the foam. Cross-linking can be achieved by a number of methods, including treatment of the polymers with a peroxide, such as an organic peroxide, treatment of the polymers with high energy irradiation, or by grafting the polymers, for example, with a cross-linkable silane such as vinyl trimethoxysilane. Cross-linking polyolefins by exposing them to high energy irradiation is described, for example, in Mukherjee, et al. "Radiation-Induced Changes is Polyolefins," Rev. Macromol. Chem. Phys. (1986) C26:415–439, incorporated herein by reference.

The preferred method of cross-linking employs an organic peroxide. Examples of organic peroxides include dicumylperoxide, 2,5-dimethyl-2,5-di(t-butylperoxy)-hexane, 1,1-bis(t-butylperoxy)-3,3,5-trimethylcyclohexane, 1,1-di-(t-butylperoxy)cyclohexane, 2,2'-bis(t-butylperoxy)-diisopropylbenzene, 4,4,'-bis(t-butylperoxy)butylvalerate, t-butylperbenzoate, t-butylperterephthalate, and t-butyl peroxide. Most preferably, the peroxide cross-linking agent is dicumylperoxide or 2,2'-bis(t-butylperoxy)-diisopropylbenzene.

The cross-linked polymer blend can be grafted. Grafting involves attaching one or more monomer or polymer to the original polymer resin chains. The grafting is generally accomplished by forming active grafting sites on the original polymer chains in the presence of monomers that can further polymerize as branches from the original polymer chains. Active grafting sites can be generated, for example, by free radicals or anions. A graft can include other monomers, such as di- and tri-allyl cyanurates and isocyanurates, alkyl di- and tri-acrylates and methacrylates, zinc dimethacrylates and diacrylates, styrenes, divinylbenzene, vinyl silanes with at least two hydrolyzable groups, and butadiene. Silane-grafted polymer blends can be cross-linked by reaction with moisture.

The polymer blends-can be foamed to make predominantly closed-cell foams. The polymer blends can also be formed under elevated temperature (thermoformed or thermoset) or elevated pressure (pressure-formed). The expanding medium, or foaming agents, useful in the practice of the present invention, are physical foaming agents or chemical foaming agents. Physical foaming agents include medium expanding compositions that are gases at temperatures and pressures encountered during the foaming step. Typically, a physical foaming agent is introduced to the polymer blend in the gaseous or liquid state and expands, for example, upon a rapid decrease in pressure. Chemical foaming agents include medium expanding compositions that are solid or liquid under ordinary processing conditions until the composition is decomposed to release gas. Chemical foaming agents can be decomposed, for example, at elevated temperatures.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium.

Chemical foaming agents include, for example, azodicarbonamide, p-p'-oxybis(benzene)sulfonyl hydrazide, p-toluenesulfonyl hydrazide, p-toluenesulfonyl semicarbazide, 5-phenyltetrazole, ethyl-5-phenyltetrazole, dinitrosopentamethylenetetramine, and other azo, N-nitroso, semicarbazide, sulfonyl hydrazides, carbonate, and bicarbonate compounds that decompose when heated. The preferred foaming agents are chemical foaming agents, such as azodicarbonamide. Combinations of various physical and/or chemical foaming agents can be used to foam the polymer blends.

Regardless of the method of cross-linking used, acceptably flexible articles, particularly foamed articles, can only be obtained in certain ranges of cross-linking density or level. Too much cross-linking can render the material inelastic. In a foam, this can result in less than optimal expansion and greater than optimal density for a given level of foaming agent. Too little cross-linking can be detrimental to physical properties such as compression set properties or thermal stability, for example. It is important to choose cross-linking levels that afford materials with particular desired properties. The silane-grafting and resulting cross-links can increase the melt strength of the composition. The cross-linking levels can be determined by establishing the gel content of the of the composition, for example, by extraction with a solvent such as xylenes. The polymer blends can have cross-link densities between about 24 to 100 percent, most preferably between 40 to 60 percent for thermoformable polymer blends and between about 95 to 100 percent for thermoset polymer blends.

The polymer blend can include foam activating agents, which decrease the decomposition temperature of the chemical foaming agent when foaming is desired. Activating agents include metal salts such as zinc salts, for example, zinc stearate or zinc oxide.

The foamed polymer blends have densities between about 1.5 and about 25 pounds per cubic foot.

Other additives, alone or in combination, can be added to the polymer blends, including particulate and fibrous fillers to reinforce, strengthen or modify the rheological properties of the material, antioxidants (e.g., hindered phenolics such as Irganox 1010, phosphites such as Irgafos 168, or polymerized trimethyl-dihydroquinoline such as Agerite AK, Resin D or Flectol H), oils, ultra-violet stabilizers, thermal stabilizers, antistatic components, flame retardants, pigments or colorants, and other processing aids. In particular, oils, such as hydrocarbon oils (e.g., mineral oil), and fillers, such as talc, silica, or calcium carbonate, are added to the polymer blends. Polymer modifiers such as oils can serve as processing aids. The oils are generally cross-linked into the polymer blend matrix by reaction with the cross-linking agent and, therefore, do not leach out of the final product.

The polymer blends preferably include between 5 and 40 weight percent EPDM and between 5 and 95 weight percent of a single-site initiated polyolefin resin having a density below 0.878 g cm$^{-3}$. The polymer blends can also include between 0 and 70 weight percent of another polyolefin resin which can be one or a blend of more than one polyolefin resin including polypropylene, high density polypropylene, linear low density polyethylene, or other polymer or copolymer of ethylene or propylene. In addition, the polymer blends can include between 0 and 30 weight percent of a hydrocarbon oil, and between 0 and 65 weight percent of a filler, such as mineral or fibrous fillers such as calcium carbonate or talc. The blend can be cross-linked during processing by reaction with an organic peroxide, such as dicumyl peroxide. The use of sulfur to vulcanize the composition is not necessary.

The cross-linking level in the blend is relatively high as evidenced by low compression set and high thermal stability. True rubber-like properties are obtained with levels as low as 20 weight percent EPDM. The blend does not maintain good properties especially in foamed applications when levels above 40 weight percent EPDM are used.

In general, the polymer blend can be prepared by mixing the polyolefin including ethylene and propylene, single-site initiated polyolefin resin, other polymer resins, and other additives are heated and mixed, for example, in an internal mixer, such as a Banbury-type mixer, or an extruder to provide a homogeneous blend. The temperature and pressure of the mixing are selected to avoid foaming. Preferred mixing conditions are at pressures between 20 and 200 psi and temperatures between 150 and 280° F. using an internal mixer. Alternatively, when an extruder is used to mix the blend, the temperature is maintained below about 275° F. and the pressure is generally between 500 and 5000 psi depending on the die (i.e., a pressure of between 2000 and 3000 psi is used to extrude a flat sheet). In general, the treatment temperature is selected to avoid substantial decomposition of the foaming agent and the cross-linking agent. The polymer blend can be pre-formed for pressing, for example, as a sheet, by roll milling or extrusion. Alternatively, the blend can be pelletized.

The polymer blend foams can be produced by compression molding, injection molding, or can be foamed as a sheet. In particular, the polymer blends are foamed by compression molding in a first pressing operation using a high tonnage hydraulic press at a temperature between 275 and 320° F. and a pressure of between 250 and 2500 psi for between 20 and 90 minutes. The foam can be further expanded in a subsequent heating stage in an oven at a temperature between 300 and 380° F. for between 20 and 320 minutes or a second pressing operation in a medium tonnage hydraulic press at a temperature between 300 and 380° F. and a pressure of between 250 and 1500 psi for between 20 and 320 minutes. It has been observed that pre-forming step helps degas the blend, the first pressing operation helps decrease the cell size and improve cell quality, and the second pressing operation helps prevent surface degradation and loss of material. The foams generally have average densities of between 1.5 and 25 pcf.

The polymer blend can be formed by pre-heating a section of a sheet to soften the blend and pressing the softened polymer blend in a mold. The polymer blend can be foamed if it contains a foaming agent and it is heated to induce foaming. The mold can be a single piece or a matching mold and can be vented. Forming and/or foaming a sheet in a mold in this way is one method of forming a gasket from the polymer blend.

The polymer blend can be laminated to other materials or to itself by heat treatment of the laminate interface. Although adhesives can be applied, it is not necessary to use an adhesive to laminate the polymer blend.

It is desired that the polymer blend, or foamed blend, have good tensile strength, shear strength, and cleavage strength. The tensile strength, elongation, compression resistance (compression deflection), compression set, and tear strength can be determined, for example, according to the procedure of ASTM D-3575. The flexibility of the polymer blend is an important component of these properties.

It is also desired that the foams be suitable for use in floatation devices. Floatation performance tests can be conducted according to the guidelines set forth by Underwriters Laboratories, Inc. in UL 1191, incorporated herein by reference. It is recommended that floatation materials generally have densities greater than 1 pound per cubic foot (pcf), a specific buoyancy of at least 58 pounds (lbs), a buoyancy retention factor of 98% for certain wearable devices (V factor) and 95% for cushions (C factor), a tensile strength of at least 20 pounds per square inch (psi), good flexibility (no cracking), and a compression deflection (25%) of at least 1 psi. The testing of the buoyancy retention further includes heat conditioning that involves treating the samples at 60° C. for 120 hours. The heat conditioning aspect of the test is essentially an elevated temperature creep test that probes the thermal stability of the material.

The thermal stability of the polymer blend can be measured from the floatation performance test, specifically the buoyancy retention factor, albeit indirectly. The thermal stability of the polymer blends relates to other applications. In particular, the polymer blends and foamed polymer blends are useful in automotive applications, particularly for making gaskets. The thermal stability of the materials in combination with the flexibility and formability make the polymer blends particularly suitable to automotive gasket applications.

The thermal stability of the polymer blends in gasket applications can be determined by monitoring their dimensional stability at elevated temperatures. For automotive applications, thermal stability can be tested by exposing a piece of the polymer blend to an elevated temperature for a particular amount of time and measuring the percent change in the dimensions of the piece. For example, a piece of a polymer blend (i.e., a 12 inch×12 inch×¼ inch piece of foam) can be heated to 158° F. for 24 hours. In other tests, for example, the pieces can be heated to 158° F. for 50 hours, 180° F. for 7 days, 257° F. for 30 minutes, 350° F. for 4 minutes, 130° F. for 66 hours, or 410° F. for 11 minutes. After cooling, the dimensions of the piece are calculated and the percent change in each dimension is calculated. Percent changes in dimensions that are less than about 8 percent, most preferably less than 5 percent, indicate polymer blends with adequate thermal stability for automotive gasket applications. Typical foam gaskets for automotive applications have foam densities between 2 and 14 pounds per cubic foot.

The following specific examples are to be construed as merely illustrative, and not limitive, of the remainder of the disclosure.

EXAMPLES

The polymer blends were prepared according to the procedures outlined above. Compositions for five examples are given below in Tables 1–13 for Examples 1–13. Examples 1–4 are comparative examples that do not contain a polyolefin including ethylene and propylene.

The polymer blends are generally prepared by mixing the components in a batch operation. The batch is weighed and segmented into sequential additions in the proportions show in Table 1. A high-shear internal mixer (i.e., a Banbury mixer) was used for mixing in the Examples provided here. The mixing is accomplished with counter rotating rotors contained within a closed chamber. A port on top of the chamber can be opened for addition of the components. The opening is sealed for-mixing with a pressurized hydraulic ram. The resultant pressure holds the material inside the chamber. The pressure further assists the rotors in softening, melting, plasticating, fusing, and blending the components which is accomplished by the heat that is provided to the chamber and the rotors and shear heat that is generated by the working of the material in the mixer. Various operations, such as scrape down or addition of other components, are carried out at different pre-designated temperatures. For example, the first melt and fusion check was carried out at about 225° F. in Example 1. At the conclusion of the addition and mixing of all components, the completed polymer blend is removed from the mixer.

Once the polymer blend is mixed, it is generally pre-formed before foaming. A calendar heated to approximately 165° F. was used to prepare a pre-form for the pressing operation in Example 1. In Example 1, the pre-form was roll milled in a two roll mill to form a sheet. Once the polymer blend was pre-formed, it was transported to a high tonnage press for expansion to a foam.

The pre-formed polymer blend is inserted into picture frame type of mold in a high tonnage hydraulic press. In Example 1, the mold was one of many daylights of a multiple cavity high tonnage hydraulic press. Once all pre-forms have been inserted into the molds, the press was closed. The pre-formed polymer blend was put under approximately 2000 psi of pressure and heated for approximately 50 minutes at 305° F. Upon release at the end of the heating period, the material was partially cross-linked and partially expanded. The partially expanded polymer blend was then transported to a low tonnage hydraulic press for final expansion of the foam.

The partially cross-linked and expanded pre-formed polymer blend was placed into a large mold cavity of a low tonnage hydraulic press and was further heated for approximately 40 minutes at 320° F. under approximately 900 psi. Following the completion of the heating period, the material was cooled and allowed to normalize to room temperature. Following pressing operations, the resulting foamed polymer blend was washed to remove unwanted in-process material from the surface of the blend. Once foamed, the polymer blend is ready for further fabrication or skiving.

The compositions of comparative examples 1–4 are shown in Tables 1–4, respectively. Examples 1–4 do not contain polyolefins including ethylene and propylene (i.e., EPR or EPDM).

TABLE 1

EXAMPLE 1 (no EPDM or EPR)

| Material | Parts per Hundred of Resin |
| --- | --- |
| EXXON LD 740 | 35 |
| DUPONT/DOW ENGAGE 8100 | 20 |
| DUPONT/DOW ENGAGE 8180 | 45 |
| KADOX 911C | 0.25 |
| IRGANOX 1010 | 0.5 |
| LUPERCO 500-4OKE | 3 |
| DONG JIN D900 B/A | 20 |
| CELOGEN OT | 0.1 |
| CAMELWITE ST | 20 |
| DRAKEOL #24 OIL | 20 |

TABLE 2

EXAMPLE 2 (no EPDM or EPR)

| Material | Parts per Hundred of Resin |
| --- | --- |
| EXXON LD 740 | 35 |
| DUPONT/DOW ENGAGE 8100 | 20 |
| DUPONT/DOW ENGAGE 8180 | 45 |
| IRGANOX 1010 | 0.5 |
| DONG JIN D900 B/A | 20 |
| KADOX 911C | 0.25 |
| CELOGEN OT/UNICELL OH | 0.1 |
| LUPERCO 500-40KE | 3.5 |
| CAMELWITE ST | 20 |
| DRAKEOL #24 OIL | 20 |

TABLE 3

EXAMPLE 3 (no EPDM or EPR)

| Material | Parts per Hundred of Resin |
| --- | --- |
| EXXON LD 740 | 35 |
| DUPONT/DOW ENGAGE 8180 | 65 |
| ZINC OXIDE | 0.25 |
| IRGANOX 1010 | 0.5 |
| LUPERCO 500-40KE | 3 |
| DONG JIN D900 B/A | 20 |
| CAMELWITE ST | 20 |
| HYDROCARBON OIL | 20 |

TABLE 4

EXAMPLE 4 (no EPDM or EPR)

| Material | Parts per Hundred of Resin |
| --- | --- |
| EXXON LD 740 | 35 |
| DUPONT/DOW ENGAGE 8180 | 65 |
| IRGANOX 1010 | 0.5 |
| DONG JIN D900 B/A | 20 |
| ZINC OXIDE | 0.25 |
| LUPERCO 500-40KE | 3.5 |

TABLE 4-continued

EXAMPLE 4 (no EPDM or EPR)

| Material | Parts per Hundred of Resin |
| --- | --- |
| CAMELWITE ST | 20 |
| HYDROCARBON OIL | 20 |

The compositions of Examples 5–13 are listed in Tables 5–13, respectively.

TABLE 5

EXAMPLE 5

| Material | Parts per Hundred of Resin |
| --- | --- |
| DOW 510 | 50 |
| DUPONT/DOW ENGAGE 8180 | 30 |
| EXXON VISTALON 2504 RUBBER | 20 |
| KADOX 911C | 0.2 |
| IRGANOX 1010 | 0.5 |
| LUPERCO 500-40KE | 1.65 |
| DONG JIN D900 B/A | 16 |
| CELOGEN OT | 0.1 |
| CAMELWITE ST | 20 |
| DRAKEOL #34 OIL | 10 |
| TECHMER WHITE PM 1787E4 | 3.5 |

TABLE 6

EXAMPLE 6

| Material | Parts per Hundred of Resin |
| --- | --- |
| DOW 510 | 50 |
| DUPONT/DOW ENGAGE 8100 | 30 |
| EXXON VISTALON 2504 RUBBER | 20 |
| BENNOX 1010 | 0.5 |
| DONG JIN D900 B/A | 16 |
| CELOGEN OT | 0.1 |
| KADOX 911C | 0.2 |
| LUPERCO 500-40KE | 1.85 |
| TECHMER WHITE PM 1787E4 | 3.5 |
| CAMELWITE ST | 20 |
| DRAKEOL #34 OIL | 15 |

TABLE 7

EXAMPLE 7

| Material | Parts per Hundred of Resin |
| --- | --- |
| DUPONT/DOW ENGAGE 8200 | 22.5 |
| DUPONT/DOW ENGAGE 8100 | 22.5 |
| DOW 510 | 30.0 |
| NORDEL 1440 | 20.0 |
| TECHMER BK PM9101 | 12.5 |
| IRGANOX 1010 | 0.5 |
| DONG JIN D900 B/A | 9.0 |
| CELOGEN OT/UNICELL OH | 0.1 |
| KADOX 911C | 0.2 |
| LUPERCO 500-40KE | 2.0 |
| CAMELWITE ST | 20.0 |
| DRAKEOL #34 OIL | 10.0 |

TABLE 8

EXAMPLE 8

| Material | Parts per Hundred of Resin |
| --- | --- |
| EXXON 117 | 50 |
| DUPONT/DOW ENGAGE 8180 | 30 |
| NORDEL 1440 RUBBER | 20 |
| ZINC OXIDE | 0.2 |
| IRGANOX 1010 | 0.5 |
| LUPERCO 500-40KE | 1.85 |
| DONG JIN D900 B/A | 16 |
| CAMELWITE ST | 20 |
| HYDROCARBON OIL | 10 |
| TECHMER WHITE PM 1787E4 | 3.5 |

TABLE 9

EXAMPLE 9

| Material | Parts per Hundred of Resin |
| --- | --- |
| EXXON 117 | 50 |
| DUPONT/DOW ENGAGE 8180 | 30 |
| NORDEL 1440 RUBBER | 20 |
| BENNOX 1010 | 0.5 |
| DONG JIN D900 B/A | 16 |
| ZINC OXIDE | 0.2 |
| LUPERCO 500-40KE | 1.85 |
| TECHMER WHITE PM 1787E4 | 3.5 |
| CAMELWITE ST | 20 |
| OIL | 15 |

TABLE 10

EXAMPLE 10

| Material | Parts per Hundred of Resin |
| --- | --- |
| DUPONT/DOW ENGAGE 8100 | 45 |
| EXXON 117 | 30.0 |
| NORDEL 1440 RUBBER | 20.0 |
| TECHMER BK PM9101 | 12.5 |
| IRGANOX 1010 | 0.5 |
| DONG JIN D900 B/A | 9.0 |
| ZINC OXIDE | 0.2 |
| LUPERCO 500-40KE | 2.0 |
| CAMELWITE ST | 20.0 |
| OIL | 10 |

TABLE 11

EXAMPLE 11

| Material | Parts per Hundred of Resin |
| --- | --- |
| DUPONT/DOW ENGAGE 8180 | 45 |
| EXXON 117.08 | 30 |
| NORDEL 1440 RUBBER | 20 |
| HARWICK BK MC 19884 | 10 |
| IRGANOX 1010 | 0.5 |
| DONG JIN D900 B/A | 9.0 |
| KODAX 911C | 0.2 |
| LUPERCO 500-40KE | 2 |
| CAMELWITE ST | 20 |

TABLE 12

EXAMPLE 12

| Material | Parts per Hundred of Resin |
| --- | --- |
| EXXON 117.08 | 45 |
| DUPONT/DOW ENGAGE 8180 | 30 |
| NORDEL 1440 | 20 |
| TECHMER BLACK PM9101 | 12.5 |
| KADOX 911C | 0.2 |
| IRGANOX 1010 | 0.5 |
| LUPERCO 500-40KE | 2.25 |
| DONG JIN D900 B/A | 10 |
| CAMELWHITE ST | 20 |
| DRAKEOL #34 OIL | 1 |

TABLE 13

EXAMPLE 13

| Material | Parts per Hundred of Resin |
| --- | --- |
| EXXON LD 740 | 35 |
| NORDEL 1440 RUBBER | 20 |
| DUPONT/DOW ENGAGE 8180 | 45 |
| KADOX 911C | 0.25 |
| IRGANOX 1010 | 0.5 |
| LUPERCO 500-40KE | 3 |
| DONG JIN D900 B/A | 20 |
| CELOGEN OT | 0.1 |
| CAMELWITE ST | 20 |
| DRAKDOL #34 OIL | 20 |

In the Tables and Examples, EXXON LD 740 is an EVA copolymer that contains 24.5% vinyl acetate, DUPONT/DOW ENGAGE 8100 and DUPONT/DOW ENGAGE 8180 are single-site initiated polyethylene resins (very low density polyethylene; VLDPE), DOW 510 is an LDPE resin, EXXON VISTALON 2504 RUBBER is an EPDM rubber, DUPONT/DOW ENGAGE 8200 is a single-site initiated polyethylene resin, NORDEL 1440 is a DuPont EPDM resin, Exxon 117.08 is a polyethylene resin, KADOX 911C is zinc oxide, IRGANOX 1010 is a phenolic antioxidant, BENNOX 1010 is an antioxidant, LUPERCO 500-40KE is dicumylperoxide in a clay support, DONG JIN D900 B/A is azodicarbonamide, CELOGEN OT is p,p'-oxybis (benzene) sulfonyl hydrazide (OBSH), CAMELWITE ST is stearic acid coated calcium carbonate, TECHMER WHITE PM 1787E4 is a $TiO_2$ coloring agent, TECHMER BK PM9101 is a black coloring agent, and DRAKEOL #24 OIL is a mineral oil. DUPONT/DOW ENGAGE 8180 has a melt index of 0.5 dg/min and a density of 0.863 g $mol^{-1}$. DUPONT/DOW ENGAGE 8100 has a melt index of 0.75–1.25 dg/min and a density of 0.865–0.871 g $mol^{-1}$. DUPONT/DOW ENGAGE 8200 has a melt index of 5 dg/min and a density of 0.870 g $mol^{-1}$. Exxon LD 740 has a melt index of 5.5 dg/min and a density of 0.948 g $mol^{-1}$. Exxon 117.08 has a melt index of 1.6 dg/min and a density of 0.930 g $mol^{-1}$. DOW 510 has a melt index of 2 dg/min and a density of 0.919 g $mol^{-1}$. EXXON VISTALON 2504 RUBBER has a Mooney viscosity of about 26 ML(1+4)×(125C) and a density of 0.86 g $mol^{-1}$. NORDEL 1440 is a DuPont EPDM resin having a Mooney viscosity of about 40 ML(1+4)×(121C) and a density of 0.86 g $mol^{-1}$.

The properties of foams prepared by compression foaming the polymer blends described in Examples 1, 2, 5, 6, and 7 are shown in Table 14. Examples 5, 6, and 7, which include a polyolefin including ethylene and propylene retain all of the good foam properties of Examples 1 and 2, and have improved floatation properties. As described above, the buoyancy retention is determined after a long period exposure to elevated temperatures and is a measure of the thermal stability of the foam. The polymer blends that include a polyolefin including ethylene and propylene (e.g., EPDM) in the formulation (i.e., Example 5 and Example 6) performed better in the floatation test (and, therefore, had better thermal stability) than the compositions that do not contain a polyolefin including ethylene and propylene (i.e., Example 2).

Examples 7–13 are a higher density foam and are examples of polymer blends and foams that are suitable for automotive applications (e.g., making gaskets). For example, the formability and thermal stability of the polymer blends and foamed polymer blends make them suitable for forming gaskets.

TABLE 14

| Properties | ASTM Ref. | Example 1 | Example 2 | Example 5 | Example 6 | Example 7 |
|---|---|---|---|---|---|---|
| Density (pcf) | 3575 | 2.22 | 2.87 | 2.33 | 2.58 | 4.23 |
| Tensile (psi) | 3575 | 33 | 51 | 39 | 37 | 78 |
| Elongation (%) | 3575 | 268 | 307 | 274 | 306 | 305 |
| Compression Deflection 25% (psi) | 3575 | 1.8 | 3.6 | 3.7 | 3.7 | 65 |
| Compression Deflection 50% (psi) | 3575 | 6.3 | 10.8 | 10.7 | 10.6 | 14.8 |
| Compression Set 50% (%) | 3575 | 29 | 28 | 27 | 30.7 | 14.6 |
| Compression Set 50% (%) | 1056 | 57 | 59 | 58.3 | 61.8 | 27.8 |
| Tear Die C (pli) | 3575 | 3.9 | 65 | 5.7 | 6.2 | 12.3 |
| Split Tear | | 2.6 | 4.3 | 3.9 | 5 | 9.4 |
| Durometer | Shore A | 0 | 3 | 2.7 | 3.3 | 9.7 |
| Durometer | Shore C | 0 | 0 | 0 | 0 | 1.7 |
| Durometer | Shore OO | 30 | 43 | 44 | 45 | 57 |
| Cell Site Mode (mm) | Occular | 0.25 | 0.20 | 0.20 | 0.20 | 0.18 |
| Cell Size Range (min) | Occular | 0.05 | 0.05 | 0.05 | 0.05 | 0.05 |
| (max) | Occular | 0.63 | 0.43 | 0.41 | 0.38 | 0.34 |
| Initial Buoyancy @ 24 hrs (lbs) UL 1191 | | | 59.3 | 59 | 62 | |
| Buoyancy Retention: V-Factor (%) | | | 91 | 102 | 99 | |
| C-Factor (%) | | | 88 | 99 | 99 | |

Other embodiments are within the claims.

What is claimed is:

1. A gasket comprising a polymer blend including a single-site initiated polyolefin resin having a density below 0.878 g cm$^{-3}$ and no more than 40 weight percent of a polyolefin including repeating units derived from ethylene and propylene, wherein a portion of the polymer blend is cross-linked and the gasket is thermally stable at 120° F.

2. The gasket of claim 1, wherein the polymer blend comprises at least 5 percent of the single-site initiated polyolefin resin and at least 5 percent of the polyolefin including repeating units derived from ethylene and propylene.

3. The gasket of claim 2, wherein the polyolefin including repeating units derived from ethylene and propylene is an ethylene-propylene-diene monomer terpolymer.

4. The gasket of claim 3, further comprising no more than about 70 weight percent of a second polyolefin resin.

5. The gasket of claim 4, wherein the second polyolefin resin includes a polypropylene, a polyethylene, or a copolymer containing ethylene or propylene.

6. The gasket of claim 2, wherein the polymer blend comprises between about 5 and 95 weight percent of the single-site initiated polyolefin resin and between about 5 and 40 weight percent of an ethylene-propylene-diene monomer terpolymer.

7. The gasket of claim 6, further comprising no more than about 65 weight percent of a filler.

8. The gasket of claim 6, further comprising no more than about 30 weight percent of an oil.

9. The gasket of claim 1, wherein the polymer blend is foamed.

10. The gasket of claim 9, wherein the foamed polymer blend has an average foam density between 1.5 and 25 pounds per cubic foot.

11. A method of making a gasket comprising the steps of:

providing a polymer blend including a single-site initiated polyolefin resin having a density below 0.878 g cm$^{-3}$ and no more than 40 weight percent of a polyolefin including repeating units derived from ethylene and propylene; and forming the polymer blend in a mold in the shape of a gasket, wherein a portion of the polymer blend is cross-linked and the gasket is thermally stable at 120° F.

12. The method of claim 11, wherein the step of forming includes pressing the polymer blend in the mold.

13. The method of claim 12, wherein the step of forming includes heating the polymer blend in the mold.

14. The method of claim 13, wherein the polymer blend is foamed.

* * * * *

UNITED STATES PATENT AND TRADEMARK OFFICE
CERTIFICATE OF CORRECTION

PATENT NO. : 6,004,647
DATED : December 21, 1999
INVENTOR(S) : John D. Bambara et al.

It is certified that error appears in the above-identified patent and that said Letters Patent is hereby corrected as shown below:

Under U.S. Documents, second page,
<u>Column 1</u>,
Delete "4,554,283  11/1985  Park".

Signed and Sealed this

Twenty-sixth Day of June, 2001

Attest:

NICHOLAS P. GODICI
*Attesting Officer*    *Acting Director of the United States Patent and Trademark Office*